United States Patent [19]

Niimi et al.

[11] Patent Number: 4,730,256

[45] Date of Patent: Mar. 8, 1988

[54] ELECTRONIC CONTROL APPARATUS INCLUDING MICROCOMPUTERS FOR CONTROLLING SOME OF THE SYSTEMS FOUND IN A VEHICLE

[75] Inventors: Yukihide Niimi, Aichi; Takashi Harada, Hekinan; Akio Kobayashi, Kariya; Ryosuke Tachi, Aichi; Takeshi Matsui, Toyohashi, all of Japan

[73] Assignee: Nippondenso Co., Ltd., Kariya, Japan

[21] Appl. No.: 749,902

[22] Filed: Jun. 28, 1985

[30] Foreign Application Priority Data

Jul. 4, 1984 [JP] Japan ................................ 59-138765

[51] Int. Cl.$^4$ ............................................... F02B 3/00
[52] U.S. Cl. .............................. 364/431.12; 364/132; 364/134
[58] Field of Search ............... 364/132, 133, 134, 136, 364/184, 431.11, 431.12, 200

[56] References Cited

U.S. PATENT DOCUMENTS

| | | | |
|---|---|---|---|
| Re. 31,997 | 10/1985 | Klotzner | 364/431.12 |
| 3,969,614 | 7/1976 | Moyer. | |
| 4,201,159 | 5/1980 | Kawai. | |
| 4,201,161 | 5/1980 | Sasayama. | |
| 4,288,849 | 9/1981 | Toshida et al. | 364/132 |
| 4,510,569 | 4/1985 | Takao et al. | 364/431.12 |
| 4,556,943 | 12/1985 | Pauwels et al. | 364/133 |
| 4,567,560 | 1/1986 | Polis et al. | 364/132 |

OTHER PUBLICATIONS

Master-Slave Configuration with One-Chip Microprocessors, by O. Zimmerl, Siemens Research and Development Reports, Jul. 1978.

*Primary Examiner*—Parshotam S. Lall
*Attorney, Agent, or Firm*—Cushman, Darby & Cushman

[57] ABSTRACT

An electronic control apparatus for use in vehicles comprised of two, one-chip microcomputers. The microcomputers each have a ROM and a RAM and are used to control different systems provided in the vehicle. The ROM of the second microcomputer stores an operational program which can be used to calculate control values for controlling various types of devices. It also stores operational map data which can be used to calculate control values for controlling various types of devices. Various signals output by the sensors provided in the vehicle are supplied to both microcomputers. At the start of the power supply to the apparatus, the operational map data stored in the ROM of the first microcomputer, which is to be used by the second microcomputer, is transferred to the RAM of the second microcomputer. The second microcomputer calculates a control value from the transferred operational map data, the signals output by the sensors and other data, thereby controlling the system assigned to it.

12 Claims, 7 Drawing Figures

ELECTRONIC CONTROL APPARATUS INCLUDING MICROCOMPUTERS FOR CONTROLLING SOME OF THE SYSTEMS FOUND IN A VEHICLE

BACKGROUND OF THE INVENTION

The present invention relates to an electronic control apparatus, including microcomputers, for controlling some of the systems found in a vehicle, including the engine and transmission mechanism.

As is known, an electronic control apparatus with a one-chip microcomputer is used in a vehicle to control the fuel injection and the ignition timing. The engine conditions are monitored, and from the detected conditions the microcomputer calculates both the proper amount of fuel to be injected and the proper ignition timing. The calculated amount of fuel is then injected into the cylinders of the engine and ignited at the calculated time, thus controlling the engine. A variety of sensors for monitoring the conditions of engines are known. Among them are: an intake airflow sensor, a cooling water temperature sensor, an engine speed sensor, a throttle valve opening sensor and a sensor for detecting the oxygen content in the exhaust gas. The output signals of these sensors are supplied to the one-chip microcomputer. The microcomputer reads data from memories in accordance with the data received from the sensors. It then processes the data, calculating a proper amount of fuel to inject and an appropriate ignition timing.

Not only the engine, but the automatic transmission mechanism, constant speed control mechanism, brake mechanism and other mechanisms of the vehicle must also be controlled. To control the engine and these mechanisms, a great amount of data must be input to the one-chip microcomputer. The microcomputer must process the data according to a very large program and, itself, must output a great amount of data. It needs a large number of input/output (I/O) ports. A one-chip microcomputer alone cannot process so much data and, hence, cannot control the engine or the mechanisms mentioned above.

In view of this, an electronic control apparatus for use in vehicles must comprise two or more one-chip microcomputers. The control system of the apparatus will, unavoidably, be very complex since the microcomputers must operate independently.

SUMMARY OF THE INVENTION

Accordingly, it is one object of this invention to provide an electronic control apparatus of a relatively simple structure, comprising a few one-chip microcomputers designed to control the engine and some additional systems of a vehicle.

Another object of the invention is that of an electronic control apparatus, comprising a few one-chip microcomputers, designed to control the engine and some additional systems and which can easily be modified to control the engine and a few other systems of a vehicle.

A further object of the invention is to provide an electronic control apparatus having a few one-chip microcomputers and designed to control the engine and some additional systems of vehicles of various types.

The present invention provides an electronic control apparatus which has two one-chip microcomputers, each having at least one ROM, at least one RAM and a few input/output circuits. Data is transferred between the microcomputers in the initial step of the operation. The operational map stored in the ROM of the first microcomputer is supplied to the RAM of the second microcomputer. Two microcomputers operate independently and calculate different control values. The control values control the control circuits provided within the vehicle.

The control apparatus can control different control circuits since the first and second microcomputers function independently. More specifically, the ROM of the first microcomputer stores the program for calculating a first control value for controlling one control circuit and an operational map to be used in calculating this control value. It also stores another operational map to be used by the second microcomputer to calculate a second control value for controlling a control circuit which is used in place of the circuit to which the second microcomputer is assigned. In the initial step of the operation, the operational map for calculating the first control value is suppled to the RAM of the second microcomputer. Then, the second microcomputer calculates the second control value from this map in accordance with the program stored in its ROM. Hence, the second microcomputer can calculate a control value for controlling a control circuit which is used in place of the circuit to which the second microcomputer is assigned. In other words, the second microcomputer can be used to control various control circuits of the same function. Hence, such control circuits can be controlled without being modified.

DETAILED DESCRIPTION OF THE PREFERRED EMBODIMENTS

Figure 1:
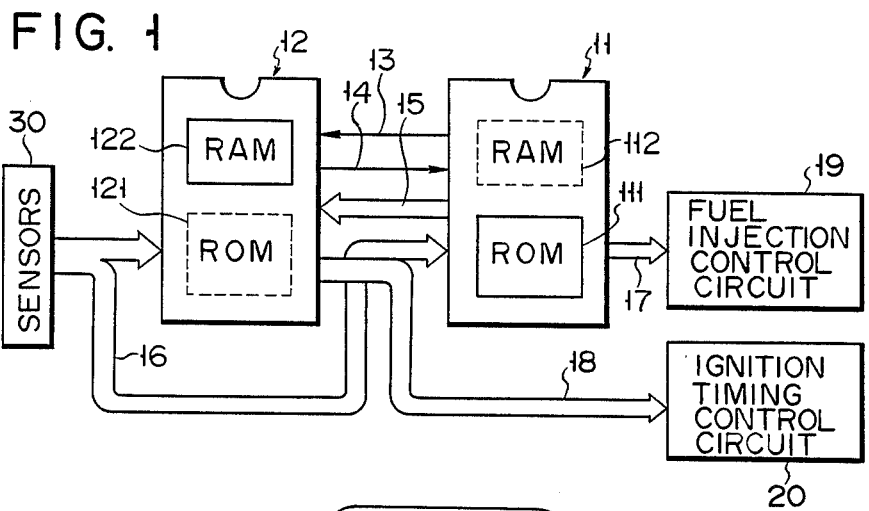
FIG. 1 is a block diagram of an electronic control apparatus according to the present invention.

FIG. 1 shows a first embodiment of the present invention, i.e., an electronic control apparatus for use in an automobile. The apparatus comprises two one-chip microcomputers 11 and 12 which function as a master CPU and a slave CPU respectively.

Each microcomputer has an input/output port. First microcomputer 11 has a ROM 111 and a RAM 112, and second microcomputer 12 has a ROM 121 and a RAM 122. Data can be transferred between microcomputers 11 and 12 through data lines 13 and 14 and a communication control signal line 15.

The control apparatus is used to control the fuel injection device and ignition device of the automobile to thereby control the engine thereof. It must calculate control values from the signals supplied from sensors 30 (i.e., an intake airflow sensor, an engine speed sensor and the like) representing the conditions of the operating engine. These signals are supplied to both microcomputers through a sensor signal line 16.

The output of first microcomputer 11 is coupled by an output signal line 17 to a fuel injection control circuit 19. The output of microcomputer 12 is coupled by an output signal line 18 to an ignition control circuit 20. Hence, microcomputer 11 can control the amount of fuel to be injected into the engine cylinders, and microcomputer 12 can control the ignition timing.

ROM 111 of first microcomputer 11 stores a program for controlling fuel injection and operational map data to be processed, according to this program, to calculate a fuel injection control value. ROM 111 also stores basic ignition operational map data for computing either the ignition timing, or for correcting the ignition timing.

ROM 121 of second microcomputer 12 stores a program for computing the ignition timing and ignition operational map data other than the ignition operational map data stored in ROM 111. The data stored in ROM 121 can be used to calculate various ignition timings which are appropriate for controlling various types of engines. The program stored in ROM 121 need not be rewritten when the engine is replaced by another type, unlike the program stored in ROM 111. The operational map data, which must be written when the engine is replaced by another type, is stored in ROM 111.

Preferably, only the ignition timing program should be stored in ROM 121, and all operational map data for calculating ignition timings, stored in ROM 111.

In the initial step of the operation of the control apparatus, or at the restart of the initialization routine of the apparatus, the ignition timing operational map data, which must be altered when the engine is replaced by another type, is transferred from ROM 111 to RAM 122 of second microcomputer 12 via data line 13. Second microcomputer 12 calculates an ignition timing from the operational map data stored in ROM 121 and RAM 122 according to the program stored in ROM 121. This timing data is supplied to ignition control circuit 20.

Figure 2:
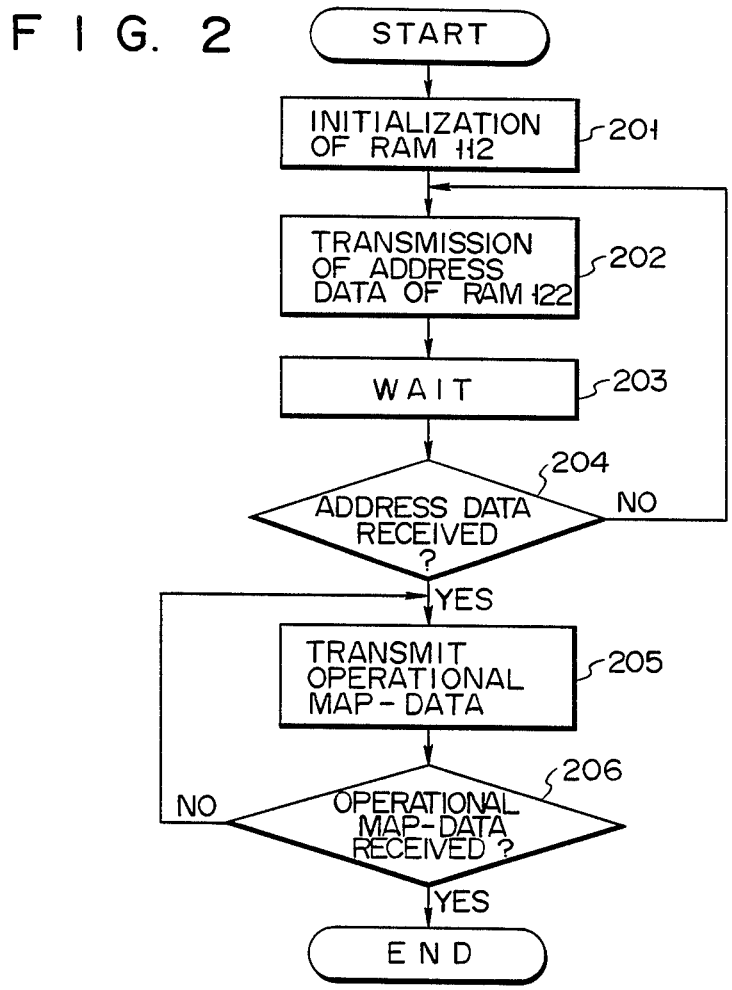
FIGS. 2 and 3 are flow charts illustrating the initialization routines of the two microcomputers forming the apparatus shown in FIG. 1.

FIG. 2 shows the initialization routine of first microcomputer 11. In step 201, RAM 122 of second microcomputer 12 is initialized. In step 202, first microcomputer 11 supplies address data to microcomputer 12 to thereby designate the first address of RAM 122 to which the ignition operational map data will be transferred from ROM 111. In the next step, 203, first microcomputer 11 waits a predetermined period of time, after which, in step 204, it is decided whether or not microcomputer 12 has received the address data. When microcomputer 12 has not received the address data, the flow returns to step 202. If microcomputer 12 has received the address data, the flow advances to step 205. In step 205, first microcomputer 11 transfers the ignition operational map data from ROM 111 to second microcomputer 12. This data transfer continues until it is detected, in step 206, that the whole ignition operational map data has been input to RAM 122. The initialization routine of first microcomputer 11 then ends.

Figure 3:
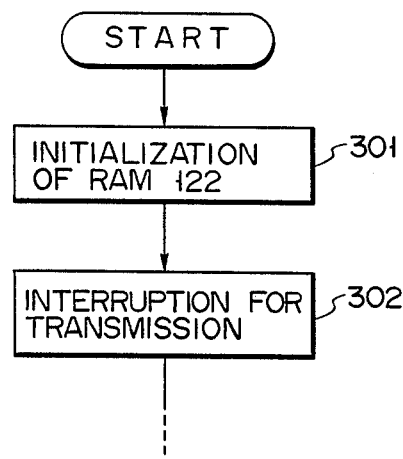
Figure 4:
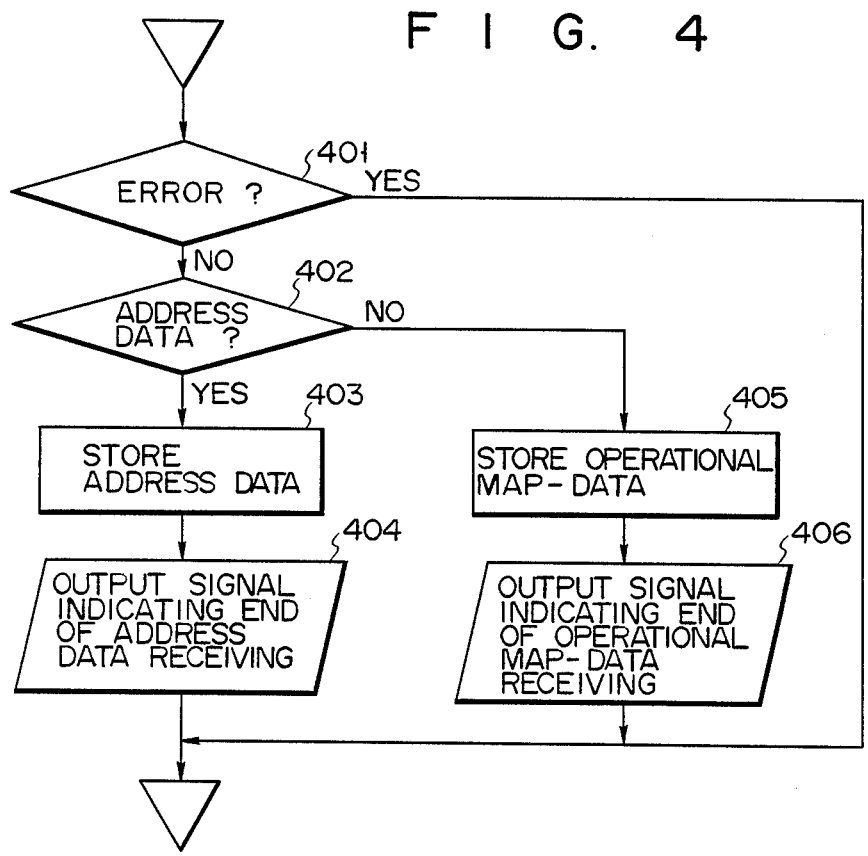
FIG. 4 is a flow chart explaining the interruption routine of the second microcomputer.

FIG. 3 explains the initialization routine of second microcomputer 12. In step 301, RAM 122 is initialized. In the next step, 302, microcomputer 12 allows for an interruption for data transmission. Then, the data transmission routine shown in FIG. 4 begins. First, in step 401, it is decided whether or not there is a transmission error. When no error is found, the flow advances to step 402, in which it is decided whether or not the data from microcomputer 11 is address data. When the data is address data, the address data is stored in microcomputer 12, step 403. In step 404 microcomputer 12 outputs a signal showing that the address data has been stored in RAM 122. When the data supplied from first computer 11 through data line 15 is found, in step 402, to be operational map data, not address data, the flow goes to step 405. In step 405, the operational map data is written into the address of RAM 122 as designated by the address data. In step 406, second microcomputer 12 supplies a signal, which shows that the operational map data has been stored in RAM 122, to first microcomputer 11. Here, the interruption routine ends.

At the end of the interruption routine, ROM 121 of second microcomputer 12 stores the basic program data for ignition control and the ignition operational map data, while RAM 122 stores the ignition operational map data transferred from first microcomputer 11. Microcomputer 12 computes an ignition timing from the ignition operational map data stored in RAM 122 and ROM 121, in accordance with the program stored in ROM 121. It then supplies a control signal representing this ignition timing to ignition control circuit 20.

As is understood from the above, microcomputers 11 and 12 function independently and control different circuits. ROM 111 of first microcomputer 11 stores the program and operational map data to be used by microcomputer 11, and the operational map data to be used by second microcomputer 12 and to be altered, as in the case when the engine is replaced by another type. In the initial step of the operation, the operational map data to be used by second microcomputer 12 is transferred from first microcomputer 11 to RAM 122. Microcomputer 12 computes an ignition timing from the operational map data stored in RAM 122 and ROM 121, in accordance with the program stored in ROM 121. Therefore, microcomputer 12 can calculate control values for controlling various types of circuits of the same function. Hence, the first embodiment of the invention can be used to control various control circuits.

Figure 5:
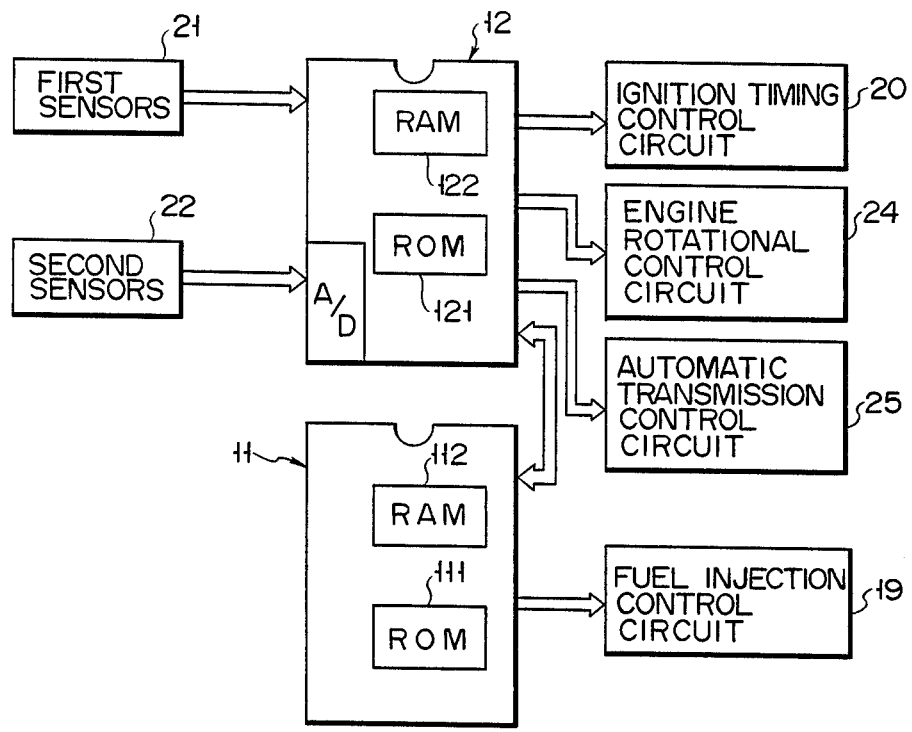
FIG. 5 is a block diagram of another electronic control apparatus according to the invention.

FIG. 5 shows a second embodiment of the invention, i.e., another electronic control apparatus. This control apparatus, like the first embodiment, comprises two one-chip microcomputers 11 and 12 (FIG. 1). First microcomputer 11 has a ROM 111 and a RAM 112 and is used to control the fuel injection of an engine. Second microcomputer 12 has a ROM 121 and a RAM 122 and is used to control the ignition timing and speed of the engine, and the automatic transmission mechanism. Sensors are provided to monitor the conditions of the engine and automatic transmission mechanism. Of these sensors, sensors 21 output digital signals, and sensors 22 generate analog signals. The output signals of sensors 21 and 22 are input to microcomputer 12. Microcomputer 12 has an A/D converter 123, which converts the analog signals from sensors 22 to digital signals.

At the start of the power supply to the electronic control apparatus, the data stored in ROM 111 of first microcomputer 11 is transferred to second microcomputer 12 as in the first embodiment. Microcomputer 12 computes an ignition timing, an engine speed control value and a transmission control value from the the data stored in RAM 122 and from the signals supplied from sensors 21 and 22, in accordance with the program stored in ROM 121. It then outputs control signals representing these values. These signals are supplied to an ignition timing control circuit 20, an engine speed control circuit 24 and an automatic transmission control circuit 25. The output signals of sensors 21 and 22 are transferred from second microcomputer 12 to microcomputer 11. Microcomputer 11 calculates a fuel injection control value from these signals in accordance with the program stored in ROM 111. It generates a control signal, indicating the fuel injection control value, which is supplied to a fuel injection control circuit 19.

To control the ignition timing in each cylinder of the engine, an appropriate ignition time $\theta$ is calculated. First, the primary ignition time $\theta 1$ is found from the speed of the engine and the load thereof, (determined by the air pressure P within the intake pipe and the amount of intake air per rotation of the engine, Q/N). Then, the secondary ignition time $\theta 2$ is determined by the temperature of the engine and the idling condition thereof. Finally, time $\theta 1$ and time $\theta 2$ are added, to obtain ignition time $\theta$ ($=\theta 1+\theta 2$).

To control the engine speed, that is, to change the engine speed to a target value, i.e., the speed of the engine in idling condition, the amount of the intake air is controlled. To achieve an automatic transmission, the ratio of the speed change gears is changed to the value best suited for the engine speed, the opening of the throttle valve and the speed of the automobile.

Figure 6:
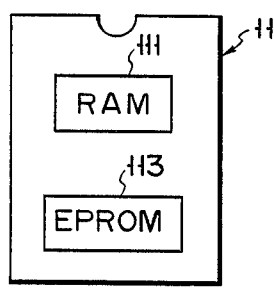
FIGS. 6 and 7 show two modifications of the first microcomputer which may be used in the invention.
Figure 7:
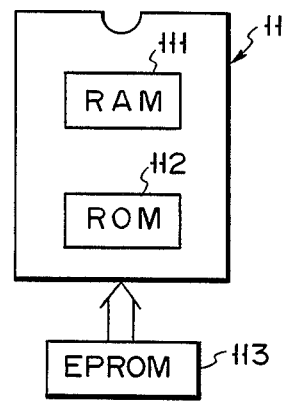

The ROM of first microcomputer 11 may be an EPROM 113 as shown in FIG. 6. Alternatively, an EPROM 113 may be connected to first microcomputer 11 as illustrated in FIG. 7.

As in the first embodiment, second microcomputer 12 can calculate control values for controlling various types of circuits of the same function from the data transferred from first microcomputer 11. In addition, first microcomputer 11 can be freely modified.

Each of the embodiments described above comprises a first one-chip microcomputer 11 (i.e., the master CPU) and a second one-chip microcomputer 12 (i.e., the slave CPU). Second microcomputer 12 may have a high-speed A/D converter and a CPU. In this case, microcomputer 12 can achieve a countermeasure against the knocking of the engine and also an ignition timing control in accordance with knock signals from a sensor provided within the engine. Further, microcomputer 12 can calculate control values fit for controlling engines of various types, since it can be supplied with operational map data from first microcomputer 11 (i.e., the master CPU).

What is claimed is:

1. An electronic control apparautus, including microcomputers, for controlling the system found in a vehicle, comprising:
    a first one-chip microcomputer having at least one ROM, at least one RAM, and at least one input-/output port and adapted to calculate a control value for controlling one of the devices provided in the system;
    a second one-chip microcomputer having at least one ROM, at least one RAM, and at least one input-/output port and adapted to calculate a control value for controlling other of the devices provided in the system;
    data transmission means connected between said first and second microcomputers for supplying data from, at least, said first microcomputer to said second microcomputer;
    initialization means for transferring an operational map stored in the ROM of said first microcomputer to the RAM of said second microcomputer;
    data sensing means for supplying items of data, representing the conditions of the system, to said first and second microcomputers; and
    output means for controlling said first and second microcomputers, which calculate control values from the items of data in accordance with the programs stored in the ROMs and the operational maps stored in the RAMs.

2. An apparatus according to claim 1, wherein said first microcomputer controls a fuel injection control circuit, and said second microcomputer controls an ignition timing control circuit.

3. An apparatus according to claim 2, wherein said first microcomputer further controls an engine idle control circuit and a transmission control circuit.

4. An apparatus according to claim 1, wherein said first microcomputer controls a fuel injection control circuit of an engine, said second microcomputer controls an ignition timing control circuit of an engine, the ROM of said second microcomputer stores a program which can be used to calculate control values for controlling various types of engines, and the ROM of said first microcomputer stores an operational map which can be altered in accordance with the type of the engine.

5. An apparatus according to claim 1, wherein said initialization means supplies address data to said second microcomputer, thus designating one of the addresses of the RAM of said second microcomputer, then transfers the operational map read from the RAM of said first microcomputer to the designated address of the ROM of said second microcomputer through said data transmission means.

6. An apparatus according to claim 1, wherein said second microcomputer includes data input means for receiving signals output by various sensors provided in the vehicle.

7. An apparatus according to claim 6, wherein said data input means receives digital signals from some of the sensors and analog signals from the other sensors and supplies them to said second microcomputer, said second microcomputer including an A/D converter, said digital signals being supplied from said second microcomputer to said first microcomputer and said analog signals being converted by the A/D converter to digital signals which are then supplied to said first microcomputer.

8. An apparatus according to claim 1, wherein said first microcomputer includes an EPROM.

9. An apparatus according to claim 1, further comprising an EPROM connected to said first microcomputer.

10. An electronic control apparatus for controlling a first device and a second device mounted on an internal combustion engine, comprising:
    sensor means for sensing the operating condition of said engine;
    a first one-chip microcomputer having a first ROM and a first RAM and calculating a first control value for said first device in response to said sensed operating condition, said first ROM storing therein a first program which defines the calculation of said first control value, a first data which is to be used in the calculation of said first control value and a first part of second data which is to be used in the calculation of a second value for said second device, and said first part of the second data being changed from engine to engine;
    a second one-chip microcomputer having a second ROM and a second RAM and calculating said second control value for said second device in response to said sensed operating condition, said second ROM storing therein a second program which defines the calculation of said second control value and a second part of said second data which is to be used in the calculation of said second control value, and said second part of the second data being unchanged from engine to engine;

data trnasmission means connecting said first microcomputer and said second microcomputer for transmission of data therethrough; and initialization means for initializing said first RAM and said second RAM and transferring said first part of the second data stored in said first ROM of said first microcomputer to said second RAM of said second microcomputer through said data transmission means before the calculations of said first value and said second value in said first microcomputer and said second microcomputer, said first part of second data transferred to said second RAM being stored therein while said second microcomputer is in operation and used in the calculation of said second value in addition to said second part of second data.

11. An apparatus according to claim 10, wherein said first device controls fuel injection in said engine and said second device controls ignition timing in said engine.

12. An apparatus according to claim 10, wherein said second microcomputer includes an analog-digital converter for converting an analog output signal of said sensor means into a digital signal to be used in the calculation os said second value, and said digital signal is transferred through said data transmission means to said first microcomputer to be used in the calculation of said first control value.

* * * * *